July 27, 1937.  J. GOGAN  2,088,372
SPRING TESTING MACHINE
Filed March 6, 1935   5 Sheets-Sheet 1

INVENTOR.
JOSEPH GOGAN
BY Kwis, Hudson & Kent
ATTORNEY.

July 27, 1937. J. GOGAN 2,088,372

SPRING TESTING MACHINE

Filed March 6, 1935 5 Sheets-Sheet 2

INVENTOR.
JOSEPH GOGAN
ATTORNEY.

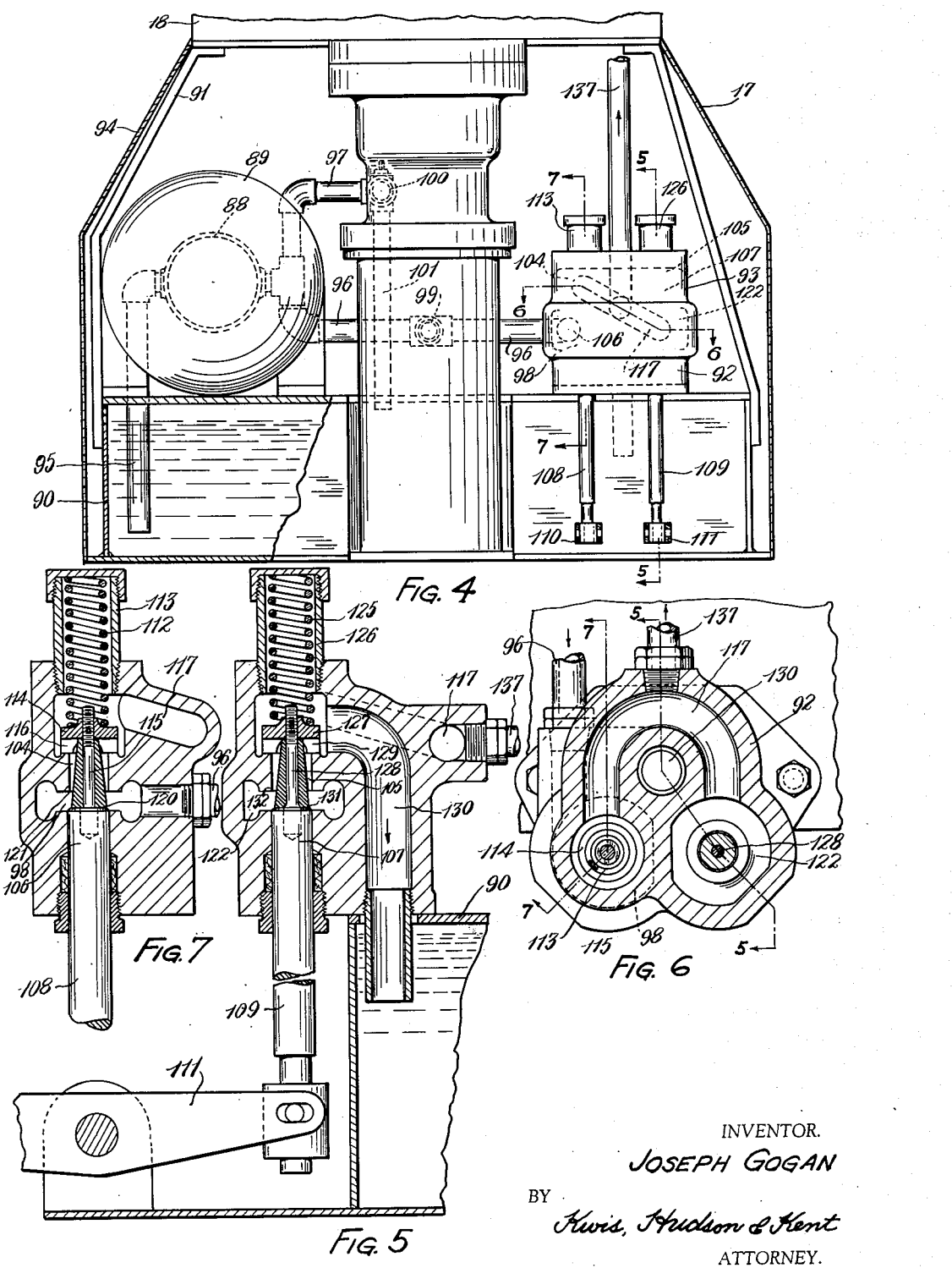

July 27, 1937. J. GOGAN 2,088,372

SPRING TESTING MACHINE

Filed March 6, 1935 5 Sheets-Sheet 5

INVENTOR.
JOSEPH GOGAN
BY Kwis, Hudson & Kent
ATTORNEY.

Patented July 27, 1937

2,088,372

UNITED STATES PATENT OFFICE 2,088,372

SPRING TESTING MACHINE

Joseph Gogan, Lakewood, Ohio

Application March 6, 1935, Serial No. 9,621

15 Claims. (Cl. 265—14)

This invention relates to testing apparatus, and more particularly to an improved machine for performing tests on individual coiled springs or like specimens.

An object of the present invention is to provide an improved testing machine embodying novel means for subjecting a spring or like specimen to a predetermined test load and having means for indicating the corresponding distortion produced in the specimen.

Another object of the invention is to provide an improved testing machine, wherein novel means is provided for distorting a spring or like specimen to a predetermined extent, and also having means for measuring the test load required to produce such predetermined distortion.

A further object of the invention is to provide a testing machine, of the type referred to, which also embodies means for performing a "setting" or "bulldozing" operation on the specimen being tested.

Other objects and advantages of the invention will be apparent from the following description, when taken in conjunction with the accompanying sheets of drawings, wherein Fig. 1 is a perspective view of a testing machine constructed according to my invention.

Fig. 4 is a front elevational view, with parts broken away, illustrating the construction at the base of the machine.

Fig. 5 is a partial vertical sectional view taken through one of the control valves, as indicated by line 5—5 of Fig. 4.

Fig. 6 is a transverse sectional view taken through the control valves, as indicated by line 6—6 of Fig. 4.

Fig. 7 is a partial vertical sectional view taken through another of the control valves as indicated by section line 7—7 of Fig. 6.

Figures 1, 2:
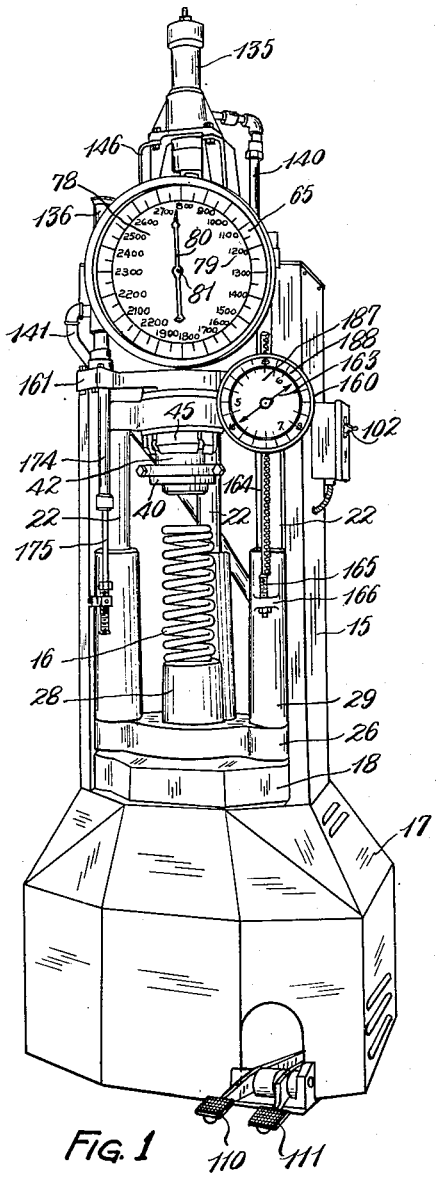
Fig. 2 is a vertical sectional view taken through this improved testing machine.

In the accompanying drawings to which detailed reference will now be made, I have illustrated an improved machine for testing coiled springs, and other specimens. Although the apparatus disclosed in the drawings represents what I now regard to be the preferred form of my invention, it will be understood, of course, that the invention may be embodied in various other testing machines and apparatus.

As will be explained more fully hereinafter, the improved testing machine of my invention is capable of performing different tests upon a coiled spring or like specimen, and by reason of the novel construction of the machine, the same mechanism is utilized for supplying the test load which is required in making each of the different tests. My improved testing machine may be used to test a coiled spring or like specimen by subjecting the specimen to a predetermined load and measuring the resulting distortion produced in the specimen. This improved testing machine can also be used to test a spring or like specimen by producing a predetermined distortion in the specimen and then measuring the value of the test load required to produce such predetermined distortion. This improved testing machine can also be used to perform what is commonly known as a "setting" or "bulldozing" operation on a coiled spring or like specimen. My improved testing machine is of very compact construction and makes possible the performance of these various tests upon individual bodies in rapid succession and with relatively inexperienced machine operators.

Figure 3:
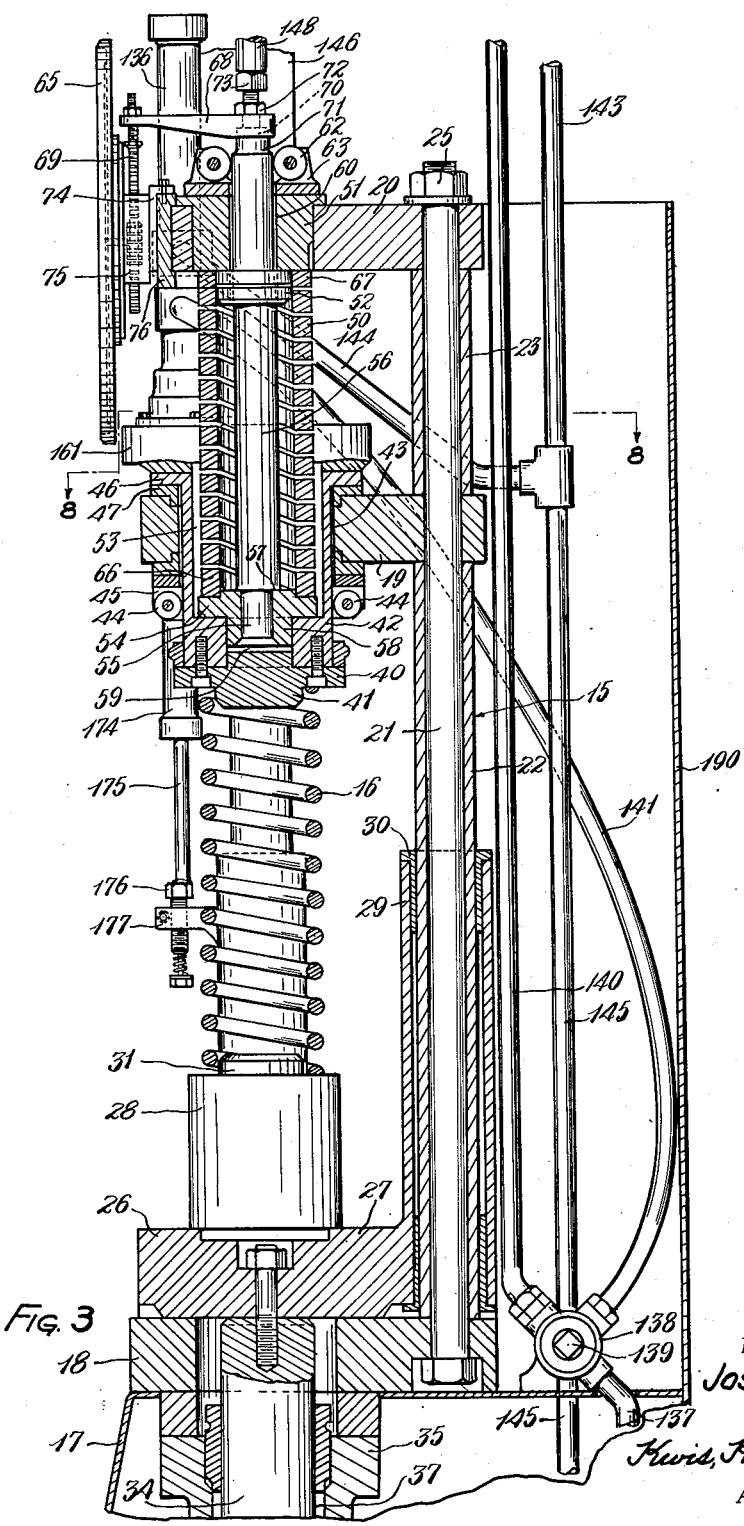
Fig. 3 is a partial vertical sectional view, similar to Fig. 2, but illustrating the apparatus on a somewhat larger scale.

My improved testing machine, as shown in Figs. 1, 2 and 3 of the drawings, may be provided with an upright frame 15 which supports the testing mechanism and is adapted to readily receive a specimen to be tested, such as the coiled spring 16. The frame may have a hollow base 17, which houses certain fluid pressure mechanism to be described hereinafter, and which forms a foundation or support for the bolster plate 18 of the frame of the machine. The upper portion of the frame of the machine is formed by transverse plate members 19 and 20 which are held in spaced substantially parallel relation to each other and to the bolster plate 18.

The plates 19 and 20 may be retained in the desired spaced relation relative to each other and to the bolster plate 18 by means of tie rods 21 and spacers 22 and 23. In this instance I show three of the tie rods 21, although any suitable number of such rods may be employed. These tie rods, as shown in Figs. 2 and 3, extend vertically through aligned openings provided in the plates 18, 19 and 20, and also extend through the tubular spacers 22 and 23 which hold the plates in the desired spaced relation. The spacers 22 are disposed between the plate 19 and the bolster plate 18, and the tubular spacers 23 are disposed between the plate 19 and the top or crown plate 20. By tightening the nuts 25 of the tie rods it will be seen that the spacers will be clamped between the plates and that the plates will be firmly held in the desired spaced relation.

My improved testing machine is also provided with a vertically movable plunger or slide 26 which acts upon the specimen 16 to apply the test load thereto. The slide 26 may be constructed with a transverse table portion 27 which supports an anvil 28, and with vertical hollow guide projections 29 having spaced bushings 30 which slide upon the tubular spacers 22. The anvil 28 is of a size and shape to form an appropriate support for the specimens to be tested, and in this instance comprises a cylindrical block which is engaged by the lower end of the coiled spring and which has a centering projection 31 adapted to extend into the opening of the spring.

For moving the slide 26 upwardly to cause the specimen to be subjected to a desired test load, I provide a cooperating cylinder and plunger 33 and 34 in the hollow base 17 of the frame, and which cylinder and plunger form a part of the above mentioned fluid pressure mechanism of the machine. The cylinder 33 is connected to and depends from the bolster plate 18, and the plunger 34 which operates in the cylinder, depends from and is connected to the table portion 27 of the slide. The cylinder 33 may be connected to the bolster plate 18 by means of a tubular member 35 through which the plunger extends, and which provides a bearing 36 for the plunger and also contains a stuffing box 37. The plunger 34 need not be fitted to the cylinder 33, but may be simply a hydraulic plunger having an exposed end 38, against which the fluid pressure may act, as will be explained more fully hereinafter.

At a distance above the bolster plate 18, and as best shown in Figs. 1, 2 and 3, the machine is provided with an anvil block or abutment 40 which is engaged by the upper end of the specimen 16. This abutment may have a centering projection 41 which extends into the opening of the spring similar to the projection 31 of the anvil 28. The abutment 40 is arranged to be movable in the frame of the machine and, to this end, the abutment is carried by a sleeve 42 which is vertically movable in an opening 43 of the frame plate 19. To reduce or eliminate friction between the sleeve 42 and the frame plate 19, I provide a circumferential series of rollers 44 which are suitably mounted in openings or brackets of a bushing 45 carried by the frame plate 19 and which form an antifriction bearing for the sleeve. The upper end of the sleeve 42 may have an outwardly extending flange 46 which prevents the sleeve from dropping downwardly through the opening 43 of the frame plate. Direct engagement of the flange 46 with the frame plate 19 may be prevented if desired by providing the opening of the frame plate with a flanged bushing 47.

Upward movement of the sleeve 42 in the opening of the frame plate 19 is yieldably resisted by a spring 50 which, as will be explained hereinafter, is of special construction and provides an accurately determined value for the test loads which are applied to the specimens. The upper end of the spring 50 engages an abutment block 51 which is mounted in an opening of the upper frame plate 20. The abutment block 51 may, if desired, be provided with a tubular bushing or extension 52, either as an integral part of the block or as a part secured thereto as by welding, and which extension is of a size to enter the opening of the spring 50. The lower end of the spring extends into the recess 53 of the sleeve 42 and engages an abutment plate or collar 54. This collar is mounted upon the reduced end portion 55 of a vertically movable rod 56 and normally seats against an annular shoulder or face 57 which forms the bottom inner wall of the sleeve 42. The collar 54 may be constructed with a centering extension 58 thereon, which engages in an opening 59 formed in the lower end wall of the sleeve 42.

As shown in Fig. 3 of the drawings, the rod 56 extends upwardly from the collar 54 within the opening of the spring 50 and also extends upwardly through an opening 60 of the abutment block 51. By reason of the interfitting of the centering projection 58 of the collar 54 in the opening 59 of the sleeve 42, the lower end of the rod 56 is held against lateral shifting or displacement. The upper portion of this rod which, as just mentioned, extends through the opening 60, is held against lateral displacement by means of anti-friction rollers 62 which are suitably mounted on a bracket or collar plate 63.

From the arrangement thus far described, it will be seen that by introducing fluid pressure into the cylinder 33, the plunger 34 will cause the slide 26 to move upwardly and subject the specimen 16 to compression between the anvil 28 and the abutment member 41. This compressive force acts against the lower end of the spring 50 and causes this spring to be compressed between the abutment collar 54 and the abutment block 51 of the frame plate 20. The compressing of the spring 50 causes the lower end thereof to move relative to its upper end, and during such movement the lower end of the spring is confined and guided by the operation of the sleeve 42 in the anti-friction rollers 44. The spring 50 is compressed in an amount substantially proportional to the test load applied to the specimen and such deflection of the spring 50 causes a corresponding vertical movement of the rod 56 and this vertical movement of the rod, as will be presently explained, is used to operate a pressure indicating gauge 65.

As a feature of my invention, I utilize a special construction for the spring 50, so that very accurate pressure indications will be had from the gauge 65. This spring is constructed so as to have two helices, or, in other words, has helical elements which for convenience of description may be said to correspond with the threads of a double threaded helical screw. I have found that ordinary helical wire springs do not produce sufficiently accurate readings on the gauge 65 to permit their use in a testing machine of this character, and I have, therefore, devised the double helix spring 50. The metal of ordinary coiled wire springs is subject to such stresses, that very irregular readings would be obtained from the gauge 65 for different degrees of compression of the spring, and this condition could not be tolerated in testing machines which are supposed to render accurate readings. Furthermore, during the compressing of an ordinary helical spring there usually is more or less sliding between the end coils and the abutments engaging the spring ends, and sometimes there is sliding between adjacent coils of the spring. This sliding occurs as the result of the tendency for the spring to wind or unwind during load variations and the friction accompanying the sliding prevents accurate load readings being obtained. To eliminate this difficulty, I have constructed the spring 50 so that inherent stresses in the metal of the spring, as well as the sliding mentioned above, have been eliminated to the extent that they do not interfere with the accuracy of the gauge readings, and I find that load readings obtained from this spring are substantially exactly proportional to the degree of compression of the spring.

In the construction of this special spring 50, I utilize a section of steel tubing of appropriate length and wall thickness, and cut spiral grooves or openings in the wall of the tubing, leaving helically extending portions of the wall to form the helices of the spring. The helical grooves are started near the ends of the steel tubing, preferably by boring holes through the wall of the tube at the points where the helical grooves are to be started. The spring may be formed from the tubing in this way by any suitable apparatus, and may, for example, be formed by using a lathe to cut the grooves through the tubing wall. In boring the starting holes and in subsequently cutting the helical grooves, ring portions 66 and 67 are left intact at the ends of the tube to connect the two helices. When the spring is constructed in this manner, there can be no sliding between the spring ends and the abutments, and, hence, the objectionable friction factor is eliminated. The load readings obtained from this spring will be the result of deflection in the metal only and will be uniform and accurate.

As mentioned above, the guage 65 is actuated by deflection of the spring 50 and to establish an operative connection between the spring and the gauge I provide the upper end of the rod 56 with a laterally extending arm 68 which is connected to the upper end of a gauge actuating rack 69. The arm 68 may have a counterbore 70 formed therein which receives a reduced portion 71 on the upper end of the rod 56. The arm 68 may be retained seated on the reduced rod portion 71 by means of a lock nut 72 provided on a screw 73 which is screwed into a tapped opening of the reduced rod portion 71.

Figure 9:
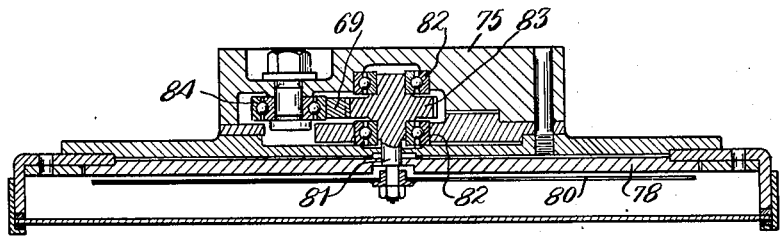
Fig. 9 is a transverse sectional view taken through one of the gauges of the machine.
Figures 10, 11:
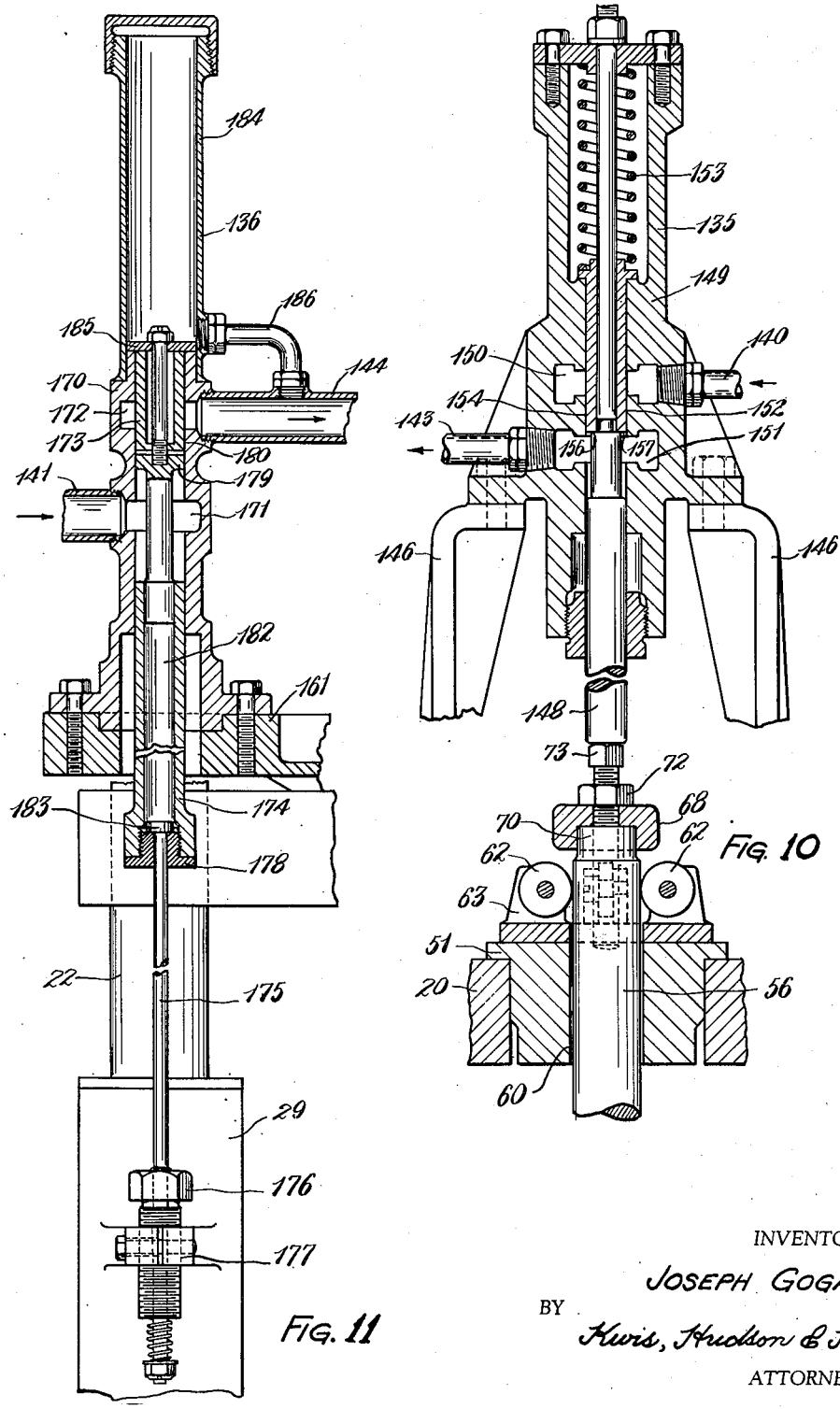
Fig. 10 is a partial sectional view taken through one of the operating valves of the machine as indicated by line 10—10 of Fig. 2.
Fig. 11 is a similar vertical sectional view taken through another operating valve of the machine as indicated by line 11—11 of Fig. 2.

The gauge 65 may be mounted upon the upper frame plate 20 by means of a bracket 74 to which the housing 75 of the gauge is connected and which is, in turn, connected to the frame plate or to a filler block 76 secured thereto. The gauge is provided with a dial 78 which bears suitable load indications 79, and with a pointer 80 which is mounted upon a rotatable spindle 81 for rotation in front of the dial. The spindle 81, as shown in Fig. 9, is mounted in suitable antifriction bearings 82 and is provided with a gear 83 with which the rack 69 meshes. The rack 69 may be held in cooperating engagement with the gear 83 by means of an anti-friction bearing 84 which forms a backing roll for the rack substantially opposite the point of tangency or engagement between the rack and the gear. From the arrangement just described, it will be seen that as the upper end of the rod 56 is moved upwardly upon deflection of the spring 50, the arm 68 will be moved upwardly at the same time and the rack 69 will be correspondingly actuated. Such movement of the rack will cause rotation of the gear 83 and of the spindle 81 which carries the pointer 80. The position of the gauge pointer will thus always give a reading in pounds corresponding with the degree of compression of the spring 50.

Reverting now to the fluid pressure means for operating and controlling the slide 26, I provide a suitable pressure generating pump 88, which may be driven by being directly connected to an electric motor 89, and which withdraws fluid from the tank 90 and supplies the same, under pressure, to the cylinder 33. As mentioned above, this pressure fluid mechanism, which includes the pump, motor, and tank, may be located in the hollow base 17 of the machine. As best shown in Figs. 2 and 4 of the drawings, the base of the machine may have a framework 91 formed from suitably arranged metal bars which may be welded or otherwise connected to the tank 90, so as to extend thereabove and to provide a support for the bolster plate 18. The tank itself is preferably constructed sufficiently strong to form a part of the structure of the base of the machine, and to also form a support for the electric motor 89 and for the housing 92 of the control valve 93. The framework of the base of the machine may have a sheet metal shield 94 secured thereto to form an enclosure for the hollow base. This shield serves to improve the appearance of the testing machine and also serves to protect the apparatus against damage and tampering, and against the entry of water or other foreign matter.

Fluid is withdrawn from the tank 90 through the suction pipe 95 and is forced into the discharge piping 96 and 97 by the pump. The discharge pipe 96 connects the pump with the receiving chamber 98 of the control valve 93, and also connects the pump directly with the cylinder 33 through the pipe connection 99. The pipe 97 is a by-pass which is controlled by a spring loaded check valve 100. When the pressure in the pump discharge reaches a predetermined value the check valve 100 is opened to by-pass fluid from the pump discharge piping 96, 97, and 99 back to the tank through the return pipe 101. When the testing machine is being used, the motor 89 is started as by means of the electric switch 102, and the pump operates continuously to supply pressure fluid to the cylinder 33 and the control valve 93. Unless the pressure of the fluid supplied by the pump is released and thus prevented from acting upon the plunger 34, the slide 26 will be actuated, and to control the operation of the machine I utilize the valve 93 to control the pressure of the actuating fluid.

The housing 92 of the control valve 93 is provided with two valve chambers 104 and 105 in which valves 106 and 107 operate, respectively, to control the supply of pressure fluid for the performance of two of the tests mentioned above. The valve 106 controls the pressure fluid for the performance of the above mentioned "setting" operation, and the valve 107 controls the supply of pressure fluid for the performance of the deflection tests on the specimen. The valve 106 has an actuating stem 108 extending from the housing 92, and the valve 107 has a similar actuating stem 109 extending from the housing. The valve stems 108 and 109 have operative connection, respectively, with the actuating pedals 110 and 111, both of which are readily accessible to the foot of the machine operator.

The valve 106 is normally urged downwardly towards its open position by means of the coiled spring 112 which is contained in the housing extension 113. The lower end of this spring bears against an abutment member 114 which is mounted upon the valve stem extension 115. The abutment member 114 is provided on the underside thereof with recesses 116 which permit the free passage of fluid through the valve chamber 104 and into the transfer passage 117 when the valve 106 is in its open position shown in Fig. 7 of the drawings. When the valve 106 is in its open position, as shown in Fig. 7, it will be noted that the valve shoulder 120 is some distance below the annular valve seat 121, and fluid being supplied to the receiving chamber 98 by the discharge piping 96 passes directly through the valve chamber 104 and into the transfer passage 117 which conducts the fluid to the receiving chamber 122 of the valve 105. The valve 105 is of similar construction to the valve 104, as will be presently explained, and when the valve 105 is in its normally open position the pressure fluid is returned to the tank 90 without causing an operating pressure to be built up in the cylinder 33.

When the "setting" or "bulldozing" operation is to be performed on the specimen 16, the operator depresses the pedal 111 which causes the valve 106 to be moved upwardly in the chamber 104, thereby moving the valve shoulder 120 past the lower edge of the annular valve seat 104. This obstructs the free passage of fluid through the valve chamber and causes the pressure to build up in the discharge piping 96, 97, 99 and in the operating cylinder 33. The increased pressure in the cylinder causes the plunger 38 to move upwardly and to thereby lift the slide 26 and cause the specimen 16 to be compressed between the anvil 28 and the abutment block 40. In performing this setting or bulldozing test, it is desirable to compress the specimen 16 to its solid height, or, in other words, to a condition in which the adjacent convolutions of the spring are in metallic contact with each other, after which the pressure is relieved and the spring is allowed to assume its extended free condition. To prevent breakage of the machine when the specimen is thus compressed to its solid height, I set the by-pass valve 100 so that fluid will be by-passed and returned to the tank 90 when the pressure of the fluid has become sufficiently great to compress the specimen to its solid height.

When the setting operation is performed, the compressing of the specimen 16 to its solid height will, of course, cause compression of the calibrated spring 50, and this will, in turn, cause operation of the gauge 65. The reading of the gauge 65 may or may not be observed by the operator in connection with this setting operation.

The valve 107 is normally held in its open position, as shown in Fig. 5 of the drawings, by a coiled spring 125 which is disposed in the housing extension 126. The lower end of this spring bears against an abutment member 127 which is mounted upon an extension stem 128 of the valve, and which is provided on its underside with fluid passages or recesses 129 to permit the free passage of fluid from the valve chamber 105 to the return passage 130 leading to the tank 90. When the valve 107 is in its normally open position, shown in Fig. 5, the valve shoulder 131 is some distance below the annular valve seat 132, and, when the valve is in this position, pressure fluid which is supplied to the receiving chamber 122 flows directly through the valve chamber 105 and returns to the tank through the passage 130. When the operator desires to perform either of the above mentioned deflection tests on the specimen 16 the pedal 111 is depressed, which causes the valve 107 to be lifted, thus moving the valve shoulder 131 into engagement with the annular seat 132 and past the lower edge thereof. When the valve 107 is thus moved to its closed position, the flow of pressure fluid through the valve housing is obstructed, and the pressure of the fluid in the transfer passage 117 of the valve housing and in the discharge piping 96, 97, 99 and in the operating cylinder 33 builds up to cause actuation of the plunger 34.

There are two tests which may be performed on the specimen 16 by actuation of the pedal 111. As mentioned above, one of these tests consists in applying a predetermined load to the specimen and then measuring the corresponding deflection produced in the specimen. The other of these tests consists in deflecting the specimen to a predetermined extent and then measuring the load required to produce such deflection in the specimen. I provide valve mechanism for automatically controlling the pressure fluid during the performance of these two tests.

During the performance of the first of the two tests just mentioned, the pressure of the fluid is automatically controlled by an operating valve 135, and during the performance of the second of the two tests the pressure of the fluid is automatically controlled by an operating valve 136. The fluid supply for the automatically operating valves 135 and 136 is obtained from piping 137 which may be connected to the transfer passage 117 of the valve housing 92. The piping 137 is connected to a selector valve 138 by means of which the operator may select which of the two tests he desires to perform on the specimen. The valve 138 is a manually operated valve, and when the first of the two tests is to be performed upon the specimen, the operator rotates the valve plug 139 to a position to connect the pipe 137 with the pipe 140 to supply pressure fluid to the housing of the valve 135, and when the operator desires to perform the second deflection test on the specimen, he rotates the valve plug 139 to the position to connect the pipe 137 with a pipe 141 to supply pressure fluid to the housing of the valve 136. A return pipe 143 leads from the housing of the valve 135 and a similar return pipe 144 leads from the housing of the valve 136. The return pipes 143 and 144 connect with a common return pipe 145 which communicates with the tank 90.

Let it be assumed that the operator wishes to perform a deflection test on the specimen, whereby the specimen is subjected to a predetermined test load and the corresponding deflection is to be measured. The operator sets the valve 139 to the position where the pipe 137 will communicate with the supply pipe 140, and then with the specimen 16 in place he depresses the pedal 111. Upon depressing this pedal the pressure of the fluid supply builds up in the cylinder 33 and in the piping 140 leading to the housing of the valve 135. For this setting of the valve 139, the valve 136 is ineffective. The increased pressure of the fluid actuates the plunger 34 to cause compression of the specimen 16. When the specimen has been subjected to the predetermined load, the valve 135 will operate to prevent the pressure of the fluid from increasing further and the desired predetermined load will be maintained on the specimen. The value of this load will be indicated by the gauge 65 which has been actuated correspondingly to the extent of compression of the calibrated spring 50.

The valve 135 is preferably arranged to be operated as the result of the deflection of the calibrated spring 50, and as best shown in Figs. 2 and 9, I provide an operating connection between the upper end of the rod 56 and the valve actuating stem 148. The valve 135 may be located above the frame plate 20 and may be supported thereon by means of suitable brackets 146. As shown in Fig. 9, the valve 135 comprises a housing 149 having fluid receiving and discharge chambers 150 and 151, and a valve element 152 which is movable in the housing to control communication between these chambers. The valve element 152 is normally urged downwardly by the coiled spring 153 so that the lower end of the valve element will be in engagement with an annular valve seat 154 disposed between the chambers 150 and 151. When the valve is in this position, communication between the chambers is prevented and the full pressure of the fluid supply acts upon the plunger 34. When the pressure of the fluid increases sufficiently to deflect the calibrated spring to an amount corresponding with the predetermined load value, the head of the screw 73 which is carried by the rod 36 engages the valve stem 148, causing the shoulder 156 of this stem to lift the valve element 152 against the action of the spring 153. When the end face 157 of the valve element has been lifted sufficiently to clear the upper edge of the annular valve seat 104, communication is established between the chamber 150 and the chamber 151, thereby allowing fluid to be by-passed and returned to the tank 90. The valve 135 will thus prevent the test load from exceeding the desired predetermined value and will cause the test load to be maintained on the specimen so long as the pedal 111 is depressed.

The gauge 65 will be actuated by the deflection of the spring 50 and the movement of the upper end of the rod 56, so that this gauge will visibly indicate to the operator the fact that the predetermined test load is being applied and maintained on the specimen.

Figure 8:
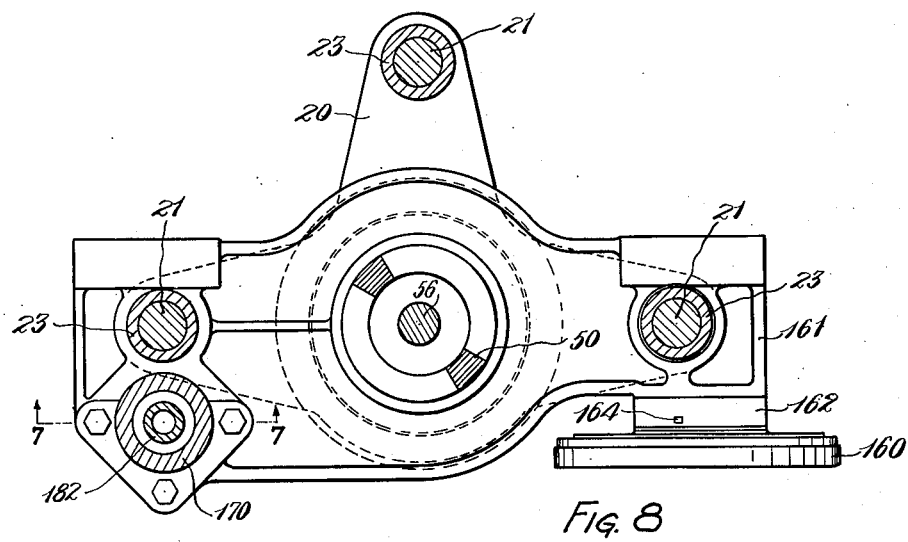
Fig. 8 is a transverse sectional view of the machine taken as indicated by line 8—8 of Fig. 2.

To measure the deflection caused in the specimen 16 by the application of the predetermined test load, as just explained, I provide a deflection indicating gauge 160 which may be arranged on the machine adjacent the pressure gauge 65, as shown in Fig. 1. Since the upper end of the specimen engages an abutment which is yieldably movable, it will be seen that the deflection of the specimen can be correctly measured by measuring the relative movement occurring between the ends thereof. Accordingly, I mount the gauge 160 upon a transversely extending plate-like bracket 161 which is movable with the sleeve 42 and may be mounted upon the upper end of the latter, as shown in Fig. 3. The gauge 160 may be of similar construction to the gauge 65 and may be mounted on the machine by having the housing 162 thereof connected to the plate-like bracket 161, as shown in Fig. 8 of the drawings. The housing of this gauge contains a rotatable spindle for actuating the gauge pointer 163 similar to the spindle 81 of the gauge 65. This spindle is also provided with a gear which meshes with a vertical rack 164 and the rack may be retained in such engagement with the pinion by a backing roll similar to the roll 84 of Fig. 9. The lower end of the rack 164 is connected to the slide 26 preferably by means of an adjusting screw 165 extending through the opening of a lug 166 formed on one of the extensions 29 of the slide.

With this arrangement for the gauge 160, it will be seen that when the predetermined test load is applied to the specimen, the relative movement occurring between the slide 26 and the plate-like bracket 161 will be the relative movement occurring between the ends of the specimen and will be indicated by the gauge 160. In making this deflection test, the operator notes the reading of the gauge 160, and if the gauge shows the deflection of the specimen by the predetermined test load as coming within the pre-established limits, he will then know whether the specimen is to be accepted or rejected.

When the operator desires to subject the specimen to a deflection test wherein the gauge 65 will show the load required to deflect the specimen to a predetermined extent, he changes the setting of the valve 139 to connect the pipe 137 with the pipe 141 to cause pressure fluid to be supplied to the housing of the valve 136. When the setting of the valve 139 has been thus changed and with the specimen 16 in place, the operator depresses the pedal 111 to cause pressure to be built up in the cylinder 33 and in the pipe 141. The rotation of the valve 139 to the position just mentioned disconnects the pipe 140 from the pipe 137 so that the valve 135 is then ineffective.

The valve 136 comprises a housing 170 having fluid receiving and discharge chambers 171 and 172, and a valve element 173 movable in the housing to control communication between these chambers. The valve element 173 has a hollow actuating stem extension 174 which projects downwardly from the valve housing.

The function of the valve 136 is to regulate the pressure of the fluid being supplied to the cylinder 33, so that the fluid will be maintained at the pressure necessary to deflect the specimen 16 the desired predetermined extent. The valve housing 170 is mounted upon the movable plate-like bracket 161 and the valve element 173 is actuated when a predetermined relative movement has taken place between the slide 26 and the bracket 161. To cause the desired actuation of the valve element 173 during the upward movement of the slide, I provide an actuating member on the slide 26, preferably in the form of a screw 176 which is adjustably mounted in a lug 177 formed on one of the slide extensions 29. When the slide moves upwardly through a given distance, the head of the screw 176 engages the lower end 178 of the valve stem 174 and causes the valve element 173 to be moved upwardly in the housing 170. When the valve element is moved through a sufficient distance to cause the shoulder 179 of the valve to rise above the upper edge of the annular valve seat 180, communication is established between the chambers 171 and 172, and pressure fluid is by-passed and returned to the tank 90 through the pipes 144 and 145. This by-passing of fluid prevents the pressure from increasing further and the specimen will be maintained in the distorted condition.

When the specimen has been compressed, as just explained, and the valve element 173 has been moved to prevent a further increase in the pressure of the actuating fluid, the gauge 160 will have been actuated by the relative movement between the slide and the bracket 161 and the operator will be able to determine from this gauge that the specimen has been deflected to the desired predetermined extent. The operator then notes the reading of the pressure gauge 65 which will be an indication of the test load required to cause the predetermined distortion of the specimen 16. If the reading of the gauge 65 comes within the limits allowed for the character of work being tested, the operator will know whether the specimen is to be accepted or rejected. After the test has been completed and the reading of the gauge 65 has been noted, the operator releases the pedal 111 which causes the pressure of the fluid in the cylinder 33 to be relieved, thereby allowing the slide 26 to move downwardly.

The downward movement of the slide is utilized to shift the valve element 173 downwardly to its normally closed position, and for this purpose I provide the rod 175 which is connected to the screw 176 and has an enlarged head 183 received in the hollow valve stem extension 174. The lower end of the hollow extension 174 is closed by a bored plug 178 through the bore of which the rod 175 passes. The arrangement described thus provides a lost motion connection between the slide 26 and the valve element 173 such that this valve element is actuated at each extremity of movement of the slide.

The upper portion of the housing of the valve 136 may be formed as a cylinder 184 which forms a guide for the upper portion of the valve element 173. If desired, a plunger disc 185 may be provided at the upper end of the valve element, so that when the latter is moved upwardly by the operation of the slide 26, air will be compressed in the cylinder 184. The air compressed in the cylinder 184 offers resistance to upward movement of the valve element so as to prevent the extension stem 174 thereof from bouncing away from the screw 176, and when the slide is moved downwardly, the body of compressed air in the cylinder will tend to initiate a return movement of the valve element 173 toward its normally closed position. A drain connection 186 may be provided from the cylinder to the return pipe 184 to keep the cylinder free from operating fluid which may leak past the valve.

The gauge 160 is preferably constructed with a movable dial, or at least with a section of the dial movable, so that the machine may be adjusted or calibrated for the deflection test wherein the specimen 16 is deflected to a predetermined extent. In this instance, the dial of the gauge 160 comprises inner and outer sections 187 and 188 and the outer section is adjustable around the inner section. The pointer 163 of the gauge also has two sections which cooperate, respectively, with the two dial sections. In calibrating the machine for the deflection test, wherein the specimen is to be compressed to a predetermined extent, the operator places a section of tubing of a known length which corresponds with the height to which the specimens are to be compressed, on the anvil 28 and operates the machine as if a test were being made. When the slide has been raised and the valve 136 has been actuated to prevent further increase in the pressure of the motive fluid, the operator then adjusts the outer dial section 188 to bring the corresponding indication thereof into registration with the longer section of the pointer 163, and thereafter the gauge will indicate the value in inches to which the specimens are compressed during the succeeding tests. The operator then removes the section of tubing and proceeds with the testing of the spring specimens, as explained above. The inner dial section 187 of the gauge 160 and the shorter section of the pointer 163 may be used to indicate the specimen height when the same is compressed solid during the "bulldozing" operation or test.

Certain portions of the frame and mechanism may, if desired, be covered or enclosed by a suitable sheet metal guard 190.

From the foregoing description and accompanying drawings, it will now be understood that I have provided an improved testing machine with which a "bulldozing" test or operation, as well as deflection tests, can be rapidly and accurately performed upon coiled springs and like specimens. It will be understood further from the foregoing description that my improved machine embodies novel means for the performance of these deflection tests and the "bulldozing" operation such that they may be rapidly and safely performed with relatively unskilled labor.

While I have illustrated and described the improved testing machine of my invention in a detailed manner, it will be understood, of course, that I do not wish to be limited to the precise details of construction and arrangements of parts illustrated and described, but regard my invention as including such changes and modifications as come within the spirit of the invention and the scope of the appended claims.

Having thus described my invention, I claim:

1. In testing apparatus the combination of spaced members adapted to receive a specimen therebetween and at least one of which members is movable, means for causing said members to apply a test load to said specimen including fluid pressure responsive means arranged to actuate said movable member and a spring cooperating with one of said members so as to be subjected to compression by the test load, means for indicating the distortion produced in the specimen, means for supplying pressure fluid to said responsive means, valve means adapted to regulate the pressure of the fluid supply, and means whereby said valve means is actuated in response to deflection of said spring corresponding with a predetermined test load value.

2. In testing apparatus the combination of a frame having a pair of movable members thereon adapted to receive a specimen therebetween, fluid pressure responsive means having operative connection with one of said members for actuating the same to apply a load to the specimen, a spring arranged to resist movement of the other member, and means actuated during the deflecting of said spring for regulating the action of said fluid pressure responsive means, the last mentioned means comprising a valve carried by the frame and operable to prevent the pressure of the fluid from exceeding a predetermined value and valve actuating means operated by movement of said other member.

3. In testing apparatus the combination of a frame having opposed movable members thereon adapted to receive a specimen therebetween, fluid pressure responsive means for actuating one of said members to thereby apply a load to the specimen, means for supplying pressure fluid to said responsive means, means yieldably resisting movement of the other of said members, means for indicating the distortion produced in the specimen, valve means controlling the pressure of the fluid supply, and means whereby said valve means is actuated in response to the movement permitted said other member by the resisting means.

4. In testing apparatus the combination of a frame having a pair of movable members thereon adapted to receive a specimen therebetween, fluid pressure responsive means having operative connection with one of said members for actuating the same to apply a load to the specimen, a spring arranged to resist movement of the other member, means for supplying pressure fluid to said responsive means, means actuated in response to deflection of said spring for indicating the value of the test load being applied, and valve means actuated upon the occurrence of a predetermined relative movement between said members for limiting the pressure of the fluid.

5. In testing apparatus the combination of a frame having a pair of movable members thereon adapted to receive a specimen therebetween, fluid pressure responsive means having operative connection with one of said members for actuating the same to apply a load to the specimen, a spring arranged to resist movement of the other member, means for supplying pressure fluid to said responsive means, and means actuated upon the occurrence of a predetermined relative movement between said members for limiting the pressure of the fluid, the last mentioned means comprising a valve carried by one of said members and having actuating means connected with the other of said members.

6. In testing apparatus the combination of a frame having opposed movable members thereon adapted to receive a specimen therebetween, power means for actuating one of said members to thereby apply a load to the specimen, means yieldably resisting movement of the other of said members, and means responsive to relative movement between said members for controlling said power means, said responsive means comprising a control device mounted on said other member and having operative connection with the power means and operating means extending from the control device and connected with said one member.

7. In testing apparatus the combination of a frame having opposed movable members thereon adapted to receive a specimen therebetween, means for supplying a test load to said specimen including power means for actuating one of said members and means yieldably resisting movement of the other of said members, means actuated in response to relative movement between said members for indicating distortion of the specimen, and means actuated in response to relative movement between said members for controlling said power means, the last mentioned responsive means comprising a control device mounted on said other member and having operative connection with the power means and operating means extending from the control device and connected with said one member.

8. In testing apparatus the combination of a frame having opposed movable members thereon adapted to receive a specimen therebetween, means for supplying a test load to said specimen including fluid pressure responsive means for actuating one of said members and means yieldably resisting movement of the other of said members, means for supplying pressure fluid to said responsive means, means actuated in response to relative movement between said members for indicating distortion of the specimen, valve means controlling the pressure of the fluid supply, and means whereby said valve means is actuated in response to relative movement between said members.

9. In a testing machine the combination of a frame having a movable slide and a movable abutment adapted to receive a specimen therebetween, power means for moving said slide to subject the specimen to a test load, a stationary abutment on the frame, a spring having one end engaging said stationary abutment and its other end engaging said movable abutment, means including a guide for preventing lateral displacement of said movable abutment and of said other spring end, and means actuated in response to a predetermined deflection of said spring for controlling said power means.

10. In a testing machine the combination of a frame having a movable slide and a movable abutment adapted to receive a specimen therebetween, power means for moving said slide to subject the specimen to a test load, a stationary abutment on the frame, a spring having one end engaging said stationary abutment and its other end engaging said movable abutment, means including a guide for preventing lateral displacement of said movable abutment and of said other spring end, a rod having connection with said other spring end, a guide on said stationary abutment and through which said rod extends, and a control for said power means arranged to be actuated by said rod.

11. In a testing machine the combination of a frame having movable members adapted to receive a specimen therebetween, a spring resisting movement of one of said members, fluid pressure means for causing relative movement between said members for subjecting the specimen to load, a pair of valves automatically operable to control said fluid pressure means by regulation of the pressure of the fluid, means whereby one of said valves is actuated by a predetermined relative movement between said members and means whereby the other is actuated in response to a predetermined deflection of said spring, and means including a manually operable valve for selectively rendering one of said automatically operable valves effective and the other ineffective.

12. In a testing machine the combination of a frame having a movable slide and a movable abutment adapted to receive a specimen therebetween, a spring arranged to resist movement of said movable abutment, fluid pressure means for actuating said slide to thereby subject the specimen to load, a valve for controlling said fluid pressure means and adapted to be actuated upon a predetermined compression of said spring, a second valve for controlling said fluid pressure means and adapted to be actuated upon a predetermined relative movement between said slide and said movable abutment, and means for selectively rendering one of the control valves effective and the other ineffective.

13. In a testing machine the combination of a frame having a movable slide and a movable abutment adapted to receive a specimen therebetween, means for actuating said slide including a fluid pressure cylinder and a continuously operating pump, a flexible member resisting movement of said movable abutment, a valve adapted to be actuated in response to a predetermined deflection of said flexible means for automatically regulating the pressure of the fluid supplied by said pump, a normally open by-pass for the pumped fluid, and a manually operable valve for closing said by-pass.

14. In a testing machine the combination of a frame having a movable slide and a movable abutment adapted to receive a specimen therebetween, means for actuating said slide including a fluid pressure cylinder and a continuously operating pump, a flexible member resisting movement of said movable abutment, a valve adapted to be actuated in response to a predetermined relative movement between said slide and said movable abutment for automatically regulating the pressure of the fluid supplied by said pump, a normally open by-pass, and a manually operable valve for closing said by-pass.

15. In testing apparatus of the character described, the combination of a frame having a pair of movable members thereon adapted to receive a specimen therebetween, fluid pressure responsive means having operative connection with one of said members for actuating the same to apply a load to the specimen, a spring arranged to resist movement of the other member, means for supplying pressure fluid to said responsive means, and means actuated upon the occurrence of a predetermined relative movement between said members for limiting the pressure of the fluid, the last mentioned means comprising a valve carried by said other member and having actuating means connected with said one member.

JOSEPH GOGAN.